United States Patent [19]
Flores, Jr. et al.

[11] Patent Number: 4,939,613
[45] Date of Patent: Jul. 3, 1990

[54] TAPE CASSETTE WITH RIGID TAPE GUIDE

[75] Inventors: Victorio T. Flores, Jr.; Michael T. Bolong, both of Rancho Palos Verdes, Calif.

[73] Assignee: Accurate Molded Products, Inc., Paramount, Calif.

[21] Appl. No.: 159,663

[22] Filed: Feb. 24, 1988

[51] Int. Cl.$^5$ ............................................. G11B 23/02
[52] U.S. Cl. .................................. 360/132; 360/130.21
[58] Field of Search ............. 360/132, 130.33, 130.21, 360/130.2, 130.31, 130.32; 242/199

[56] References Cited
U.S. PATENT DOCUMENTS

| | | | |
|---|---|---|---|
| 3,235,264 | 2/1966 | Mikrut | 274/11 |
| 3,348,786 | 10/1967 | Miller et al. | 242/55.13 |
| 3,432,111 | 3/1969 | Ryder | 242/55.13 |
| 3,495,787 | 2/1970 | Wallace | 242/199 |
| 3,642,228 | 2/1972 | Tollkuhn | 242/199 |
| 3,706,426 | 12/1972 | Prahl | 242/198 |
| 3,751,043 | 8/1973 | Bracci | 360/132 |
| 3,796,394 | 3/1974 | Souza | 242/199 |
| 3,910,692 | 10/1975 | Scibilia | 352/130 |
| 3,934,842 | 1/1976 | Posso | 242/199 |
| 4,006,493 | 2/1977 | Gerry | 360/132 |
| 4,096,538 | 6/1978 | Oishi | 360/132 |
| 4,131,243 | 12/1978 | Machida | 242/199 |
| 4,187,998 | 2/1980 | Okamura et al. | 242/199 |
| 4,231,532 | 11/1980 | Popov et al. | 360/132 X |
| 4,506,846 | 3/1985 | Gelardi et al. | 242/199 |
| 4,793,570 | 12/1988 | Gelardi et al. | 242/199 |
| 4,809,928 | 3/1989 | Hoffrichter et al. | 242/199 |

FOREIGN PATENT DOCUMENTS

| | | | |
|---|---|---|---|
| 2348994 | 4/1974 | Fed. Rep. of Germany | 360/132 |
| 3633163 | 4/1987 | Fed. Rep. of Germany | 360/132 |
| 0124072 | 7/1984 | Japan | 360/132 |
| 0672576 | 5/1952 | United Kingdom | 360/132 |

Primary Examiner—Robert S. Tupper
Assistant Examiner—Andrew L. Sniezek
Attorney, Agent, or Firm—Christie, Parker & Hale

[57] ABSTRACT

A tape cassette is provided which has a rigid tape guide which provides for guiding the tape perpendicularly across the magnetic head of a tape machine. The cassette includes a casing body and cover with the tape guide mounted between. The tape guide is of unitary construction and includes a generally horizontally-extending, flat top section and a generally horizontally-extending, flat bottom section, spaced vertically apart from each other, and connected together by a generally vertically-extending support section. The tape guide includes a first roller support mount on one end and a second roller support mount on the other end. Each roller support mount includes both a pin for mounting a roller and a curved reinforcing member extending vertically therefrom. Both the pin and reinforcing member are formed integrally with the support mount. A pair of guide structures extends horizontally away from the vertical section where each such guide structure has a vertically-extending tape guide surface along its height. The roller mounting pins are parallel to each other and to the vertically-extending tape guide surfaces.

10 Claims, 3 Drawing Sheets

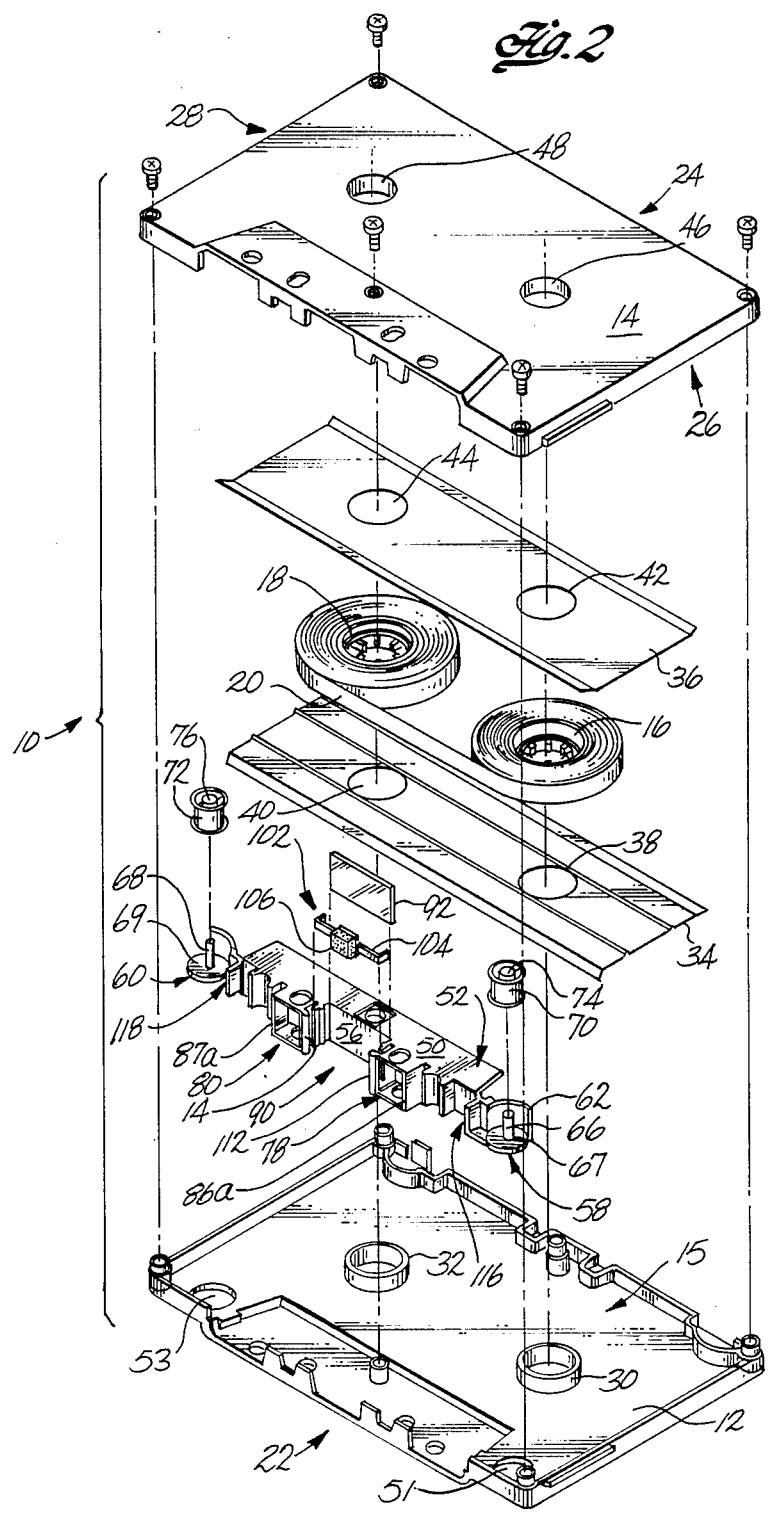

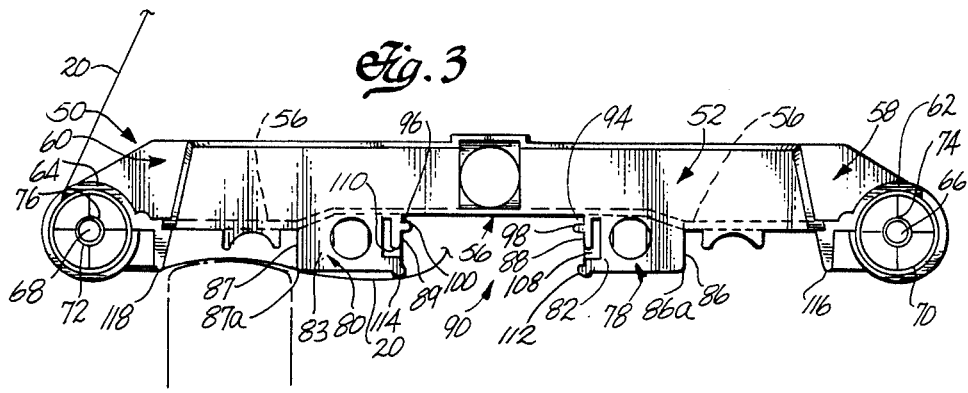
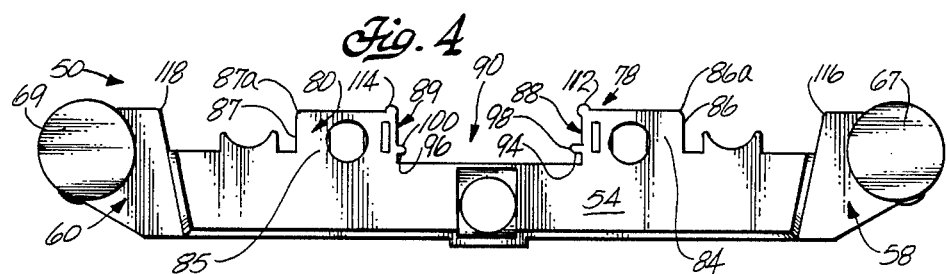
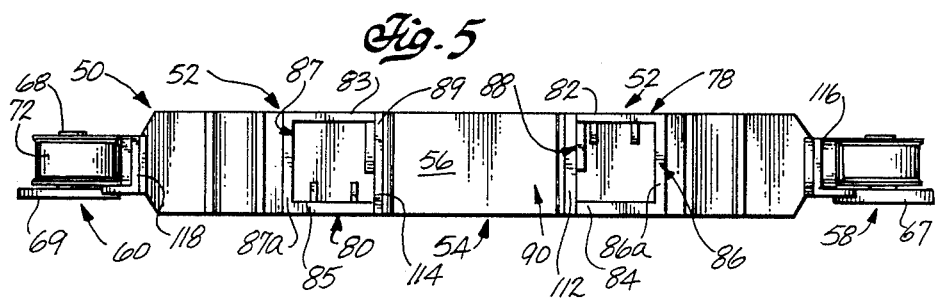
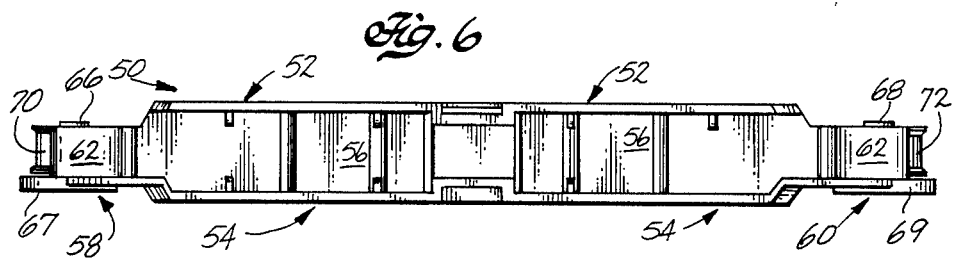

TAPE CASSETTE WITH RIGID TAPE GUIDE

FIELD OF THE INVENTION

This invention relates to cassettes which contain a magnetic tape wound on two reels and able to pass from reel to reel while contacting a magnetic head of a tape player/recorder. More particularly, the invention relates to a unique guide assembly which forms part of the tape cassette and which provides for proper positioning of the tape relative to the magnetic head.

BACKGROUND OF THE INVENTION

There are many different types and styles of tape cassettes currently available for use with tape player/recorders. The available cassettes generally include a cassette housing made of two sections which fit together to define an open space therebetween. A pair of tape reels, on which a magnetic tape is mounted, is mounted in the open space so that the reels can rotate to thereby guide the tape across the surface of the magnetic head.

The quality of the sound being recorded or reproduced is enhanced when the tape runs exactly perpendicularly across the magnetic head. Any deviation from perpendicularity results in degradation of sound quality. It is therefore important that while a tape cassette is produced as economically as possible, it still provides for the appropriate perpendicularity between the tape and the magnetic head.

One relatively inexpensive method used to produce the components of a tape cassette is by injection molding plastic materials into the appropriate shapes. For example, U.S. Pat. No. 4,506,846 to Gelardi et al discloses a tape cassette which includes upper and lower halves which are mounted together with a molded plastic tape guide mounted in the space between the cassette halves. As is the case with other cassettes, the cassette provided by Gelardi et al includes two reels and a length of magnetic tape on the reels. The tape guide includes two metal pins spaced apart from each other over which the tape slides as it passes across the magnetic head of the tape player/recorder. The metal pins are provided to maintain the perpendicularity of the tape to enhance the sound performance of the cassette. Gelardi et al disclose that the pins are provided so that the "desired perpendicularity is no longer made dependent on the current state of the molding art to create the mold for forming the tape guide."

Gelardi et al disclose that the metal pins are required to overcome various problems they found with the cassette described in U.S. Pat. No. 3,934,842 to Posso. The '842 patent to Posso discloses a cassette for recording tape which includes a body, a cover, and a tape guide all molded independently of plastic. The tape guide is in one piece and includes two transverse ribs, each of which includes a central notch with a rounded edge. The rounded edges are coplanar and define a sliding surface for the tape.

Two pins, separate from the guide, are on the base of the cassette body adjacent the ends of the guide. It is disclosed that the rounded edge sliding surface is parallel to the geometric axis of rotation of the reels and to the face of the recording and reading head.

Since the pins on which the rollers are mounted are not on the tape guide, but, instead, are on the body of the cassette, which is a molded part separate from the guide, the alignment of the pins relative to the various surfaces of the tape guide may not be as desired.

There is a need in the art for a tape cassette which: (1) does not require metal pins, as are required by the cassette disclosed by Gelardi et al; (2) is of a simple design; (3) is economical to manufacture; and (4) ensures the perpendicularity of the tape relative to the magnetic head to thereby optimize sound reproduction and recording.

SUMMARY OF THE INVENTION

This invention relates to a cassette for holding a recording tape for use in a tape machine provided with a tape head. The cassette comprises a casing body and a casing cover for mounting on the casing body to thereby define between the casing body and cover an enclosed space for mounting a tape supply reel and a tape takeup reel. A rigid tape guide of unitary construction is mounted in the enclosed space for positioning a tape properly relative to the tape head as the tape passes from the tape supply reel to the tape takeup reel. The tape guide includes a generally horizontally-extending, flat top section and a generally horizontally-extending, flatbottom section spaced vertically apart from each other and connected together by a generally vertically-extending support section. A first roller support mount is integrally formed with the generally flat bottom section and extends generally horizontally away from one of its ends. A second roller support mount is integrally formed with the generally flat bottom section and extends generally horizontally away from its opposite end. Each such roller support mount includes both a pin for mounting a roller and a curved reinforcing member extending vertically therefrom, where both the pin and the reinforcing member are formed integrally with the support mount. A pair of the guide structures are integrally formed with the tape guide, are adjacent each other, and extend horizontally away from the vertical section. Each such guide structure has a generally rectangular vertical cross-section, and includes a horizontally-extending top wall, a horizontally-extending bottom wall, a pair of horizontally-spaced apart, vertically-extending distal side walls and a pair of vertically-extending adjacent side walls. Each such vertically-extending adjacent side wall includes a vertically-extending tape guide surface along the height of its front-facing edge, wherein the roller mounting pins are parallel to each other and to the vertically-extending tape guide surface.

BRIEF DESCRIPTION OF THE DRAWINGS

These and other features, aspects and advantages of the present invention will become better understood with reference to the following description, appended claims, and accompanying drawings, wherein:

FIG. 2 is a semi-schematic exploded perspective view of the tape cassette of FIG. 1;

FIG. 3 is a top-plan view of a preferred embodiment of a tape guide provided in accordance with practice of principles of the present invention showing a portion of the tape path through the cassette;

FIG. 4 is a bottom-plan view of the tape guide of FIG. 3;

FIG. 5 is a front view of the tape guide of FIG. 3; and
FIG. 6 is a rear view of the tape guide of FIG. 3.

DETAILED DESCRIPTION OF THE DRAWINGS

Figure 1:
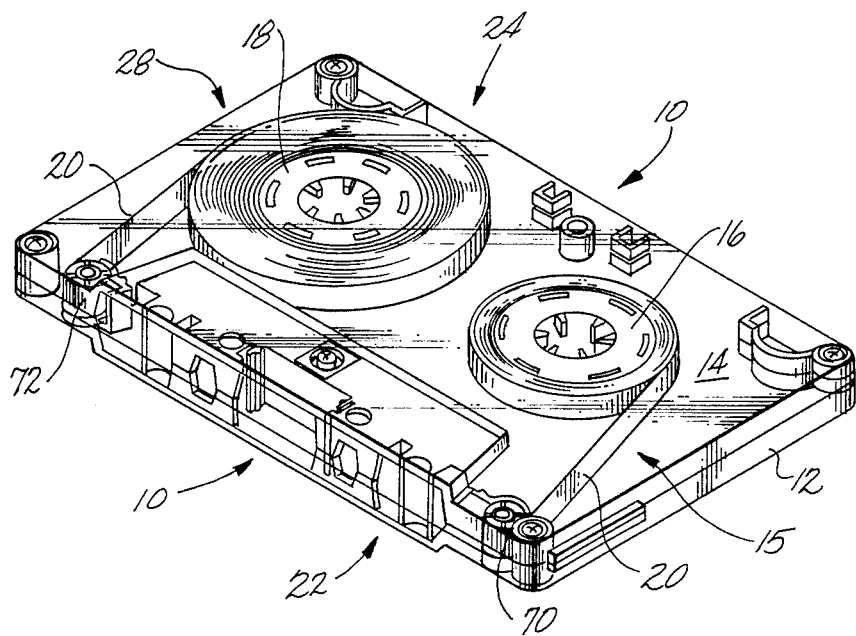
FIG. 1 is a semi-schematic perspective view of a preferred embodiment of a tape cassette provided in accordance with practice of principles of the present invention, having a tape guide of unitary construction positioned therein.

Referring to FIGS. 1 and 2, there are shown semi-schematic perspective and exploded views, respectively, of a tape cassette 10 provided in accordance with practice of principles of the present invention. Although such a tape cassette 10 can be held in any position, for purposes of exposition herein, the position of the components of the cassette relative to each other are described where the "front" of the cassette is the area exposed to the magnetic head of a tape player/recorder. The cassette "back" is the area opposite the front, and the "top" is the surface of the cassette facing up when the front of the cassette is inserted into the player/recorder. The "bottom" of the cassette is the planar surface opposite and parallel to the top, and the "left" and "right" sides of the cassette are described as though the cassette is being viewed from the front.

The tape cassette 10 of the present invention includes a bottom half or cassette housing 12 and a top half or cassette cover 14. The cover and housing can be made of various plastic materials, such as polystyrene, which can be molded, for example, by injection molding, into the appropriate shapes.

When the cassette housing 12 and the cover 14 are mounted together, they define between them an enclosed space 15 in which a tape supply reel 16 and a tape takeup reel 18 are mounted. A tape 20 is mounted on the reels and is moved from reel to reel as the reels are turned by a capstan on the player/recorder (not shown) into which the cassette is inserted. The designations "takeup" reel and "supply" reel are provided only for convenience since the tape machine rotates the reels in both directions. While the tape is being played, a first one of the reels is the supply reel and the second reel is the takeup reel; while the tape is being rewound, the opposite is true. The fully assembled cassette 10 has a front side 22, a back side 24, a right side 26, and a left side 28.

Turning particularly to FIG. 2, the bottom half of the cassette housing 12 includes a pair of vertically-extending annular rings 30 and 32 on which bottom portions of the tape reels 16 and 18, respectively, are mounted for rotational movement. Located above and below the reels 16 and 18 and extending substantially across the width of the cassette are washers 34 and 36 which are preferably made of a flat, clear, friction-resistant, plastic material, such as polyester film. The washer 34 has holes 38 and 40 through it which are spaced apart from each other along the length of the washer. The holes 38 and 40 fit respectively over the annular rings 30 and 32. Thus, in addition to providing a mounting for the tape reels 16 and 18, the annular rings 30 and 32 provide for proper positioning of the washer 34. The washer 36 includes a pair of holes 42 and 44 through it which, when assembled, register the holes 38 and 40, and which are positioned by annular rings 46 and 48 which extend downwardly from the cover and through the holes 38 and 40. The annular rings 46 and 48 fit into the top portion of the tape reels 16 and 18, respectively. When the cassette is fully assembled, the reel 16 rotates on the rings 30 and 46 and the reel 18 rotates on the rings 32 and 48.

Mounted in the enclosed space 15 between the casing body 12 and the cover 14 is a guide 50 provided in accordance with the present invention to ensure the proper positioning of the tape relative to the magnetic head of the tape player/recorder when the tape is passing across the head. As is described below in detail, the casing body 12 has a pair of vertical holes 51 and 53 through its bottom surface which are spaced apart horizontally from each other near its front 22 and into which two circular end portions of the guide are mounted.

1 Turning to FIGS. 3-6, in addition to FIGS. 1 and 2, the detailed construction of a preferred tape guide provided in accordance with the present invention can be understood. It is required that the tape guide 50 is of one-piece construction. In a preferred embodiment, the one-piece guide is formed by injection molding of a plastic material, such as polystyrene, ABS (acrylonitrile butadiene styrene), or other appropriate polymer having a relatively low coefficient of friction. If desired, the guide can be made of metal or ceramic or other suitable material.

The tape guide 50 includes a generally horizontally-extending flat top section 52 and a generally horizontally-extending flat bottom section 54 spaced vertically apart from each other and connected together by a generally vertically-extending support section 56. This provides the guide with a rigid "I-beam" type construction. A pair of roller support mounts 58 and 60 are integrally formed with the tape guide 50. In a preferred embodiment, the support mounts 58 and 60 extend generally horizontally away from the right and left sides of the bottom section 54. The support mounts 58 and 60 include vertically-extending, curved reinforcing members 62 and 64, respectively, which are formed integrally with the support mounts and are an extension of the vertical support section 56 of the "I-beam". A pin 66 is integrally molded onto a circular portion 67 of the support mount 58, and a pin 68 is integrally molded onto a circular portion 69 of the support mount 60. The pins 66 and 68 extend vertically away from the centers of the circular portions 67 and 69 of lower support mounts 58 and 60, respectively, for mounting rollers 70 and 72. The rollers 70 and 72 have hubs 74 and 76, respectively, which slide over the vertical pins 66 and 68 for rotational movement thereon.

A pair of guide structures 78 and 80 are integrally formed with the tape guide, are adjacent each other, extend horizontally away from the vertical support section 56 and are open at their front-facing ends. Both such guide structures 78 and 80 are box-shaped and include horizontally-extending top walls 82 and 83, respectively, horizontally-extending bottom walls 84 and 85, respectively, vertically-extending distal side walls 86 and 87, respectively, and vertically-extending adjacent (or facing) side walls 88 and 89, respectively. Providing guide structures 78 and 80 having a box-shape increases their rigidity and, as a result, the relative position of the walls which form the guide structures is fixed. An aperture 90 is between the adjacent side walls 88 and 89.

When the cassette is assembled, the circular portions 67 and 69 of the support mounts 58 and 60 extend into the holes 51 and 53 in the casing body 12. Having the holes 51 and 53 in the casing body allows the circular portions 67 and 69 to be of heavier construction, i.e., thicker vertically, than would otherwise be possible.

Turning particularly to FIG. 2, a rigid shield 92, having a rectangular shape, is mounted in the tape guide 50 of the present invention. The shield 92 is useful for keeping magnetic signals produced near the recording head away from the tape 28 while the tape is on the reels 16 and 18. The shield 92 fits into slots 94 and 96 (best seen in FIGS. 3 and 4), which are provided by ribs 98 and 100, which extend vertically along the length of the walls 88 and 89, respectively.

The tape guide sub-assembly 50 also includes a biasing means 102 (best seen in FIG. 2) comprising a thin, flexible, rectangularly-shaped metal leaf spring 104, which has a tape contacting member 106 mounted at about its center and facing toward the front of the cassette. The biasing means 102 is mounted in the aperture 90 between the walls 88 and 89. Mounting for the biasing means 102 is provided by a slot 108 in the right-hand wall 88 and a slot 110 in the left-hand wall 89, which extend approximately two-thirds the way down the length of the walls. The biasing means provides a horizontal force uniformly against the tape 20 as it crosses the magnetic head during the tape player operation.

A first tape guide surface 112 extends vertically along the height of the front-facing edge of the wall 88. A corresponding first tape guide surface 114 extends vertically along the height of the front wall 89. The front edge 86a of the wall 86 and the front edge 87a of the wall 87 also extend vertically along the height of their respective walls. The edge 86a is a second tape guide surface, is adjacent the surface 112, and is parallel to it. The edge 87a is a second tape guide surface, is adjacent the surface 114, and is parallel to it. Having the tape guide surfaces 86a, 112, 87a and 114 provided on the walls of the above-described rigid box-shaped structures enhances their rigidity and, thus, during operation of the tape cassette, their parallel relationship is maintained. Additionally, third tape guide surfaces 116 and 118 are formed integrally with the support mounts 58 and 60, respectively. The tape guide surfaces 116 and 118 are parallel to the surfaces 112 and 114 and to the surfaces 86a and 87a. It is preferred that the second and third tape guide surfaces are in the same imaginary vertical plane, i.e., they extend the same horizontal distance from the tape guide vertical support section 56.

It is a critical feature of the present invention that the first, second and third tape guide surfaces 112, 114, 86a, 87a, 116, and 118 are parallel to each other, are parallel to the pins 66 and 68, and are parallel to the vertical surfaces of the rollers 70 and 72. It is a surprising result of the unitary configuration and "I-beam" construction of the rigid tape guide provided in accordance with the present invention that these parallel relationships can be maintained in an injection molded plastic part.

When in operation, the tape extends from the supply reel 16 across the surface of the roller 70, across the vertical guide surface 116, across the vertical edge 86a of the wall 86, across the vertically-extending tape guide surfaces 112 and 114, across the vertical edge 87a of the wall 87, across the roller 72, and onto the takeup reel 18.

As the tape is moved, it is maintained perpendicular to the tape head because of the unique construction of the rigid tape guide 50. For example, it is required that the tape guide 50 is of a rigid, unitary "I-beam" construction, with the support mounts 58 and 60 being part of the tape guide. The mounts 58 and 60 do not move relative to the other components of the tape guide during operation of the cassette because of the provision of the reinforcing members 62 and 64 and the provision of the relatively heavily constructed circular portions 67 and 69, which, as is described above, are mounted in the holes 51 and 53 of the casing body 12.

Because of the above-described construction of the tape guide 50 of the present invention, the pins 66 and 68 which extend vertically from the circular portions 67 and 69 of the mounts 58 and 60, and the vertical surfaces of the rollers 70 and 72, are maintained in their position parallel to the tape guide surfaces 116, 86a, 112, 114, 87a and 118 during operation of the cassette. The importance of maintaining the pins parallel to the tape guide surfaces, so that the vertical roller surfaces are also parallel, can be understood by referring to FIG. 3, which illustrates the path a tape takes as it moves through the cassette. The tape 20 contacts a large portion of the vertical surfaces of the rollers 70 and 72. (In this illustration, the tape is only shown contacting the left side roller 72.) Because of the large contact area between the roller surfaces and the tape, any slight misalignment of the pins 66 and 68 from vertical, which thereby causes the roller surfaces to be other than vertical, has a magnified effect on the tape deviating from its desired perpendicular alignment with the magnetic head. Any such deviation from perpendicularlity results in the degradation of sound quality.

As compared to the tape cassette provided in accordance with the present invention, prior art tape cassettes include pins and rollers which are not mounted to the tape guide but, instead, are mounted on the base which is separated from the tape guide. Having the pins separated from the tape guide is detrimental to maintaining the pins parallel to surfaces on the tape guide. As is described above, the detrimental effect on the proper alignment of the tape as it crosses the tape head, caused by having pins which are not of the proper parallel alignment with the tape guide surfaces, is magnified because of the large contact area between the tape and the vertical roller surfaces.

Turning, for example, to U.S. Pat. No. 4,506,846 to Gelardi et al, surfaces A and D are on the tape guide, while the pins 30 and 32 on which the rollers 34 and 36 are mounted are on the cassette back 18. Having the pins and rollers on a part of the cassette separate from the tape guide can result in misalignment. Furthermore, the Gelardi et al tape guide does not have a rigid I-beam construction, and the surfaces A and D are not supported in position as are the surfaces 116 and 118 of the unitary, rigid tape guide 50. Thus, in operation, the surfaces A and D can tend to become relatively misaligned from the pins 30 and 32 and the rollers 34 and 36. Furthermore, nothing in Gelardi et al discloses or suggests that the surfaces of the rollers 34 and 36 should be parallel to any of the tape guide surfaces as is the case with the tape guide provided in accordance with practice of the present invention.

The above description of a preferred embodiment of a tape cassette 10 provided in accordance with practice of the principles of the present invention is for illustrative purposes. Because of variations which will be apparent to those skilled in the art, the present invention is not intended to be limited to the particular embodiments described above. The scope of the invention is defined in the following claims.

What is claimed is:

1. A tape cassette for holding a recording tape for use in a tape machine provided with a tape head, the tape cassette comprising:
    (a) a cassette housing;

(b) a cassette cover for mounting on the cassette housing to thereby define between the housing and cover an enclosed space for mounting a tape supply reel and a tape takeup reel; and (c) a rigid tape guide of unitary construction mounted in the enclosed space for properly positioning a tape relative to a tape head as the tape passes from the tape supply reel to the tape takeup reel, the tape guide comprising:
  (i) a horizontal, flat top section and a horizontal, flat bottom section spaced vertically apart from each other and connected together by a vertical support section;
  (ii) a first roller support mount integrally formed with the flat bottom section and extending horizontally away from a first one of its ends;
  (iii) a second roller support mount integrally formed with the flat bottom section and extending horizontally away from its end opposite from the first end, wherein each such roller support mount includes both a pin for mounting a roller and a curved reinforcing member extending vertically therefrom, where both the pin and the reinforcing member are formed integrally with the support mount, and the pins are parallel to each other;
  (iv) a pair of box-shaped guide structures integrally formed with the tape guide, adjacent each other, extending horizontally away from the vertical support section and open at their front-facing ends, wherein each such guide structure includes a horizontal top wall and a horizontal bottom wall, the top and bottom walls connected by a distal side wall on one side of the structure and an adjacent side wall on the opposite side of the structure, wherein each such adjacent side wall includes a vertical first tape guide surface along the height of its front-facing edge, and each such distal side wall includes a vertical second tape guide surface along the height of its front-facing edge; and
  (v) a third vertical tape guide surface formed integrally with each roller support mount, wherein each of the first, second and third tape guide surfaces are parallel to each other and to the roller mounting pins in a direction that is perpendicular to the passing direction of the tape.

2. A tape cassette as is claimed in claim 1 wherein the rollers are mounted on the roller mounting pins and the vertical surfaces of the rollers are parallel to the tape guide surfaces.

3. A tape cassette as is claimed in claim 1 wherein the tape guide is molded of plastic.

4. A tape cassette as is claimed in claim 1 wherein each of the second and third tape guide surfaces extends the same horizontal distance from the tape guide vertical support section.

5. A tape cassette for holding a recording tape for use in a tape machine provided with a tape head, the tape cassette comprising:
  (a) a cassette housing;
  (b) a cassette cover for mounting on the cassette housing to thereby define between the housing and cover an enclosed space for mounting a tape supply reel and a tape takeup reel; and
  (c) a rigid molded plastic tape guide of unitary construction mounted in the enclosed space for properly positioning a tape relative to a tape head as the tape passes from the tape supply reel to the tape takeup reel, the tape guide comprising:
    (i) a horizontal, flat top section and a horizontal, flat bottom section spaced vertically apart from each other and connected together by a vertical support section;
    (ii) a first roller support mount integrally formed with the flat bottom section and extending horizontally away from a first one of its ends;
    (iii) a second roller support mount integrally formed with the flat bottom section and extending horizontally away from its end opposite from the first end, wherein each such roller support mount includes both a pin for mounting a roller and a curved reinforcing member extending vertically therefrom, where both the pin and the reinforcing member are formed integrally with the support mount, and the pins are parallel to each other;
    (iv) a pair of box-shaped guide structures integrally formed with the tape guide, adjacent each other, extending horizontally away from the vertical support section and open at their front-facing ends, wherein each such guide structure includes a horizontal top wall and a horizontal bottom wall, with the top and bottom walls connected by a distal side wall on one side of the structure and an adjacent side wall on the opposite side of the structure, wherein each such adjacent side wall includes a vertical first tape guide surface along the height of its front-facing edge, and each such distal side wall includes a vertical second tape guide surface along the height of its front-facing edge; and
    (v) a third vertical tape guide surface formed integrally with each roller support mount wherein each of the first, second and third tape guide surfaces are parallel to each other and to the roller mounting pins in a direction that is perpendicular to the passing direction of the tape, where each such roller mounting pin has a roller mounted thereon with the vertical surface of each such roller being parallel to the first, second and third tape guide surfaces.

6. A tape cassette as is claimed in claim 5 wherein each of the second and third tape guides extends the same horizontal distance from the tape guide vertical support section.

7. A tape cassette for holding a recording tape for use in a tape machine provided with a tape head, the tape cassette comprising:
  (a) a cassette housing having a pair of vertical holes through its bottom surface, the holes spaced apart horizontally from each other near the front of the cassette housing;
  (b) a cassette cover for mounting on the cassette housing to thereby define between the housing and cover an enclosed space for mounting a tape supply reel and a tape takeup reel; and
  (c) a rigid molded plastic tape guide of unitary construction mounted in the enclosed space for properly positioning a tape relative to a tape head as the tape passes from the tape supply reel to the tape takeup reel, the tape guide comprising:
    (i) a horizontal, flat top section and a horizontal, flat bottom section spaced vertically apart from each other and connected together by a vertical support section;

(ii) a first roller support mount integrally formed with the flat bottom section and extending horizontally away from a first one of its ends;

(iii) a second roller support mount integrally formed with the flat bottom section and extending horizontally away from its end opposite from the first end, wherein each such roller support mount includes a circular portion having a pin extending vertically therefrom for mounting a roller and a curved reinforcing member extending vertically therefrom, where both the circular portion and the reinforcing member are formed integrally with the support mount, and the pins are parallel to each other, the circular portion of the first roller support mount located in one of the vertical holes in the cassette housing, and the circular portion of the second roller support mount located in the other vertical hole in the cassette housing;

(iv) a pair of box-shaped guide structures integrally formed with the tape guide, adjacent each other, extending horizontally away from the vertical support section and open at their front-facing ends, wherein each such guide structure includes a horizontal top wall and a horizontal bottom wall, with the top and bottom walls connected by a distal side wall on one side of the structure and an adjacent side wall on the opposite side of the structure, wherein each such adjacent side wall includes a vertical first tape guide surface along the height of its front-facing edge, and each such distal side wall includes a vertical second tape guide surface along the height of its front-facing edge; and (v) a third vertical tape guide surface formed integrally with each roller support mount wherein each of the first, second and third tape guide surfaces are parallel to each other and to the roller mounting pins in a direction that is perpendicular to the passing direction of the tape, where each such roller mounting pin has a roller mounted thereon with the vertical surface of each such roller being parallel to the first, second and third tape guide surfaces.

8. A tape cassette as is claimed in claim 7 wherein each of the second and third tape guides extends the same horizontal distance from the tape guide vertical support section.

9. A tape cassette for holding a recording tape for use in a tape machine provided with a tape head, the tape cassette comprising:

(a) a cassette housing having a pair of vertical holes through its bottom surface, the holes spaced apart horizontally from each other near the front of the cassette housing;

(b) a cassette cover for mounting on the cassette housing to thereby define between the housing and cover an enclosed space for mounting a tape supply reel and a tape takeup reel; and (c) a rigid molded plastic tape guide of unitary construction mounted in the enclosed space for properly positioning a tape relative to a tape head as the tape passes from the tape supply reel to the tape takeup reel, the tape guide comprising:

(i) a horizontal, flat top section and a horizontal, flat bottom section spaced vertically apart from each other and connected together by a vertical support section;

(ii) a first roller support mount integrally formed with the flat bottom section and extending horizontally away from a first one of its ends;

(iii) a second roller support mount integrally formed with the flat bottom section and extending horizontally away from its end opposite from the first end, wherein each such roller support mount includes a circular portion having a pin extending vertically therefrom for mounting a roller and a curved reinforcing member extending vertically therefrom, where both the circular portion and the reinforcing member are formed integrally with the support mount, and the pins are parallel to each other, the circular portion of the first roller support mount located in one of the vertical holes in the cassette housing, and the circular portion of the second roller support mount located in the other vertical hole in the cassette housing;

(iv) a pair of box-shaped guide structures integrally formed with the tape guide, adjacent each other, extending horizontally away from the vertical support section and open at their front-facing ends, wherein each such guide structure includes a horizontal top wall and a horizontal bottom wall, with the top and bottom walls connected by a distal side wall on one side of the structure and an adjacent side wall on the opposite side of the structure, wherein each such adjacent side wall includes a vertical first tape guide surface along the height of its front-facing edge and each such distal side wall includes a vertical second tape guide surface along the height of its front-facing edge; and (v) a third vertical tape guide surface formed integrally with each roller support mount wherein each of the first, second and third tape guide surfaces are parallel to each other and to the roller mounting pins in a direction that is perpendicular to the passing direction of the tape, where each such roller mounting pin has a roller mounted thereon with the vertical surface of each such roller being parallel to the first, second and third tape guide surfaces, and each of the second and third tape guide surfaces extends the same horizontal distance from the vertical support section.

10. A tape cassette for holding a recording tape for use in a tape machine provided with a tape head, the tape cassette comprising:

(a) a cassette housing having a pair of vertical holes through its bottom surface, the holes spaced apart horizontally from each other near the front of the cassette housing;

(b) a cassette cover for mounting on the cassette housing to thereby define between the housing and cover an enclosed space for mounting a tape supply reel and a tape takeup reel; and (c) a rigid molded plastic tape guide of unitary construction mounted in the enclosed space for properly positioning a tape relative to a tape head as the tape passes from the tape supply reel to the tape takeup reel, the tape guide comprising:

(i) a horizontal, flat top section and a horizontal, flat bottom section spaced vertically apart from each other and connected together by a vertical support section;

(ii) a first roller support mount integrally formed with the flat bottom section and extending horizontally away from a first one of its ends;

(iii) a second roller support mount integrally formed with the flat bottom section and extending horizontally away from its end opposite from the first end, wherein each such roller support mount includes a circular portion having a pin extending vertically therefrom for mounting a roller and a curved reinforcing member extending vertically therefrom, where both the circular portion and the reinforcing member are formed integrally with the support mount, and the pins are parallel to each other, the circular portion of the first roller support mount located in one of the vertical holes in the cassette housing, and the circular portion of the second roller support mount located in the other vertical hole in the cassette housing;

(iv) a pair of guide structures integrally formed with the tape guide, adjacent each other, extending horizontally away from the vertical support section and open at their front-facing ends, wherein each such guide structure includes horizontally-spaced-apart first and second vertical tape guide surfaces; and (v) a third vertical tape guide surface formed integrally with each roller support mount wherein each of the first, second and third tape guide surfaces are parallel to each other and to the roller mounting pins in a direction that is perpendicular to the passing direction of the tape, where each such roller mounting pin has a roller mounted thereon with the vertical surface of each such roller being parallel to the first, second and third tape guide surfaces.

* * * * *